United States Patent
Gerbert-Gaillard et al.

(10) Patent No.: US 6,225,581 B1
(45) Date of Patent: May 1, 2001

(54) INSTALLATION COMPRISING AN ELECTRICAL SWITCHGEAR APPARATUS AND A CABLE INTERLOCK

(75) Inventors: Alain Gerbert-Gaillard, Vourey; Frédéric Court, Saint Nicolas de Macherin, both of (FR)

(73) Assignee: Square D Company, Palatine, IL (US)

(*) Notice: Subject to any disclaimer, the term of this patent is extended or adjusted under 35 U.S.C. 154(b) by 0 days.

(21) Appl. No.: 09/468,547

(22) Filed: Dec. 21, 1999

(30) Foreign Application Priority Data

Feb. 8, 1999 (FR) .................................................. 99 01660

(51) Int. Cl.⁷ ...................................................... H01H 9/20
(52) U.S. Cl. .................................. 200/50.01; 200/50.12; 200/50.21; 200/50.33
(58) Field of Search ................................ 200/50.01–50.4, 200/329, 330, 331

(56) References Cited

U.S. PATENT DOCUMENTS

| | | | |
|---|---|---|---|
| 4,400,599 | * | 8/1983 | Rickmann .......................... 200/50.36 |
| 4,405,844 | * | 9/1983 | Dixon et al. .......................... 20/50.12 |
| 4,546,666 | | 10/1985 | Secord ................................. 74/502.4 |
| 4,626,638 | * | 12/1986 | Samples et al. ....................... 200/331 |
| 4,806,710 | * | 2/1989 | Kalvaitis et al. .................. 200/50.12 |
| 5,164,883 | * | 11/1992 | Little et al. .................... 200/50.24 X |
| 5,227,952 | * | 7/1993 | Romano et al. .............. 200/50.35 X |
| 5,486,978 | * | 1/1996 | Fishovitz ....................... 200/50.21 X |
| 5,726,401 | * | 3/1998 | Green et al. ........................ 200/50.33 |
| 5,814,777 | * | 9/1998 | Green et al. ........................ 200/50.33 |
| 6,060,668 | * | 5/2000 | Azzola et al. ...................... 200/50.33 |

FOREIGN PATENT DOCUMENTS

| | | |
|---|---|---|
| 1450988 | 7/1972 | (DE) . |
| 0855527 | 7/1998 | (EP) . |
| 0857881 | 8/1998 | (EP) . |
| WO 97/37366 | 10/1997 | (WO) . |

* cited by examiner

Primary Examiner—J. R. Scott
(74) Attorney, Agent, or Firm—Parkhurst & Wendel, L.L.P.

(57) ABSTRACT

An installation comprises at least one electrical switchgear apparatus a movable mechanism which is interlocked with a device such as an access door by a kinematic transmission cable comprising a flexible sheath and a core designed to slide in the sheath. The ends of the sheath and of the core are respectively fixed to a fixed part of the apparatus and to the movable mechanism by fixing apparatus comprising an end-piece operating in conjunction with the corresponding part of the cable, a housing designed to receive the end-piece, and a locking device with dead point passage designed to oppose insertion of the end-piece in the housing when the force exerted on the locking device in an insertion direction remains lower than an insertion threshold and to enable insertion of the end-piece in the housing when the force exerted on the device means in an insertion direction is greater than the insertion threshold.

10 Claims, 7 Drawing Sheets

INSTALLATION COMPRISING AN ELECTRICAL SWITCHGEAR APPARATUS AND A CABLE INTERLOCK

BACKGROUND OF THE INVENTION

The invention relates to an installation comprising an electrical switchgear apparatus and a movement transmission cable, designed to interlock the apparatus with an external mechanism. More specifically, the invention relates to a device for fixing a kinematic transmission cable with respect to an electrical switchgear apparatus.

Sheathed cables are commonly used to perform interlocks between two switchgear apparatuses such as circuit breakers, as illustrated by the document U.S. Pat. No. 5,726,401, or between a switchgear apparatus and an external device, for example between a circuit breaker and the access door to an electrical cabinet, as illustrated by the document U.S. Pat. No. 4,405,844, or to achieve mechanical remote controls, as illustrated by the document EP-A-0,183,931. These cables conventionally comprise a flexible external sheath in which a core can slide. In addition to its mechanical protection function, the flexible sheath provides the advantage of more or less keeping its shape once fixed, in spite of the internal sliding of the cable core, and allows a great freedom of positioning. One advantage of sheathed cables over other kinematic transmission devices such as rods or belts lies in the possibility of adapting their length and shape on site, when fitting is performed, which leaves a greater freedom of relative positioning of the apparatuses to be connected.

To fit a sheathed kinematic transmission cable between two movable means of an electrical installation, it is necessary to secure a first end section of the sheath with respect to a fixed element of the installation close to the first movable means to be connected, to secure the other end section of the sheath with respect to a fixed element of the installation close to the second movable means to be connected, and to secure each of the two ends of the core with respect to one of the movable means to be connected, the order of the operations being able to vary according to the installation technique used.

Usually, assembly requires one or more tightening operations due to the fact that fixing is performed by means of threaded rods and nuts, as shown in particular by the document U.S. Pat. No. 5,726,401 already referred to above. The assembly operation is therefore relatively long and tedious. As electrical switchgear apparatuses are often confined in frames or cabinets, the extremely limited access space available around the movable means to be connected makes assembly even more delicate.

SUMMARY OF THE INVENTION

The object of the invention is therefore to facilitate assembly of a kinematic transmission by sheathed cable between various elements of an installation comprising at least one electrical switchgear apparatus, without increasing the overall dimensions of the installation. Its object is also to make this assembly quicker and to enable assembly to be performed in spite of a small access volume.

These objects are achieved by means of an installation comprising at least one electrical switchgear apparatus and a kinematic transmission cable designed to interlock a movable means of the electrical switchgear apparatus with a mechanism external to the apparatus, the electrical switchgear apparatus comprising a frame, the kinematic transmission cable comprising a flexible sheath and a core able to slide in the sheath, the flexible sheath comprising an end section constituting a first part of the cable fixed with respect to the frame of the electrical switchgear apparatus by a first fixing means, the core comprising an end section external to the sheath constituting a second part of the cable fixed to the first movable means by a second fixing means, at least one of the fixing means comprising an end-piece operating in conjunction with the corresponding part of the cable, a housing designed to receive the end-piece, and locking means with dead point passage designed to oppose insertion of the end-piece in the housing when the force exerted on the locking means in an insertion direction remains lower than an insertion threshold and to enable insertion of the end-piece in the housing when the force exerted on the locking means in an insertion direction is greater than the insertion threshold. The fitter simply has to exert a sufficient force on the end-piece to insert the latter in its housing. The tightening operation is eliminated so that assembly can be performed with one hand and does not require a large access volume. Furthermore, passing the dead point gives the fitter a tactile feeling of engagement of the fixing, before any visual checking. The interlocking device may be of any kind: access door to the switchgear apparatus, other electrical switchgear apparatus or mechanical remote control for example. The electrical switchgear apparatus can be fixed or withdrawable.

Preferably, said locking means are able to oppose extraction of the end-piece from the housing when the force exerted on the locking means in an extraction direction remains lower than an extraction threshold and to enable extraction of the end-piece from the housing when the force exerted on the locking means in an extraction direction is greater than the extraction threshold. Disassembly is thus possible under the same conditions of ease and quickness.

According to one embodiment, the housing is formed by two notches made in two parallel flanges of a support.

The locking means preferably comprise a locking part able to take an unlocking position enabling the end-piece to be inserted in the housing and a locking position preventing the end-piece from being extracted from the housing, and a flexible return means urging the locking part to its locking position, the end-piece operating in conjunction with the flexible return means in such a way that the locking part is flexibly removed to its unlocking position when the end-piece is forcibly inserted in the housing. Locking with dead point passage is thus achieved in a particularly simple manner. It is then also easy to arrange for the flexible return means to operate in conjunction with the end-piece in such a way that the locking part is flexibly removed to its unlocking position when the end-piece is forcibly extracted from the housing.

Advantageously, the flexible return means is a spring acting directly on the end-piece. According to a preferred embodiment, the spring is provided with a first ramp and a second ramp shaped in such a way that the first ramp is able to operate in conjunction with the end-piece to clear the flexible return means when the end-piece is inserted, the second ramp being designed to operate in conjunction with the end-piece to hold the latter in position in its housing. The second ramp is such that it is able to operate in conjunction with the end-piece to clear the flexible return means when extraction is performed. The first and second ramp are shaped in such a way that the extraction force threshold is lower than the insertion force threshold.

The fixing means as described above can be used for fixing the core of the cable to the movable means of the electrical apparatus. It can also be intended for fixing the sheath with respect to the frame of the apparatus. The first and second means preferably each comprise an end-piece operating in conjunction with the corresponding part of the cable, a housing designed to receive the end-piece, and locking means with dead point passage designed to oppose insertion of the end-piece in the housing when the force exerted on the locking means in an insertion direction remains lower than an insertion threshold and to enable insertion of the end-piece in the housing when the force exerted on the locking means in an insertion direction is greater than the insertion threshold.

BRIEF DESCRIPTION OF THE DRAWINGS

Other advantages and features of the invention will become more clearly apparent from the following description of two embodiments of the invention, given as non-restrictive examples only and represented in the accompanying drawings in which.

DETAILED DESCRIPTION OF THE PREFERRED EMBODIMENT

Figure 1:
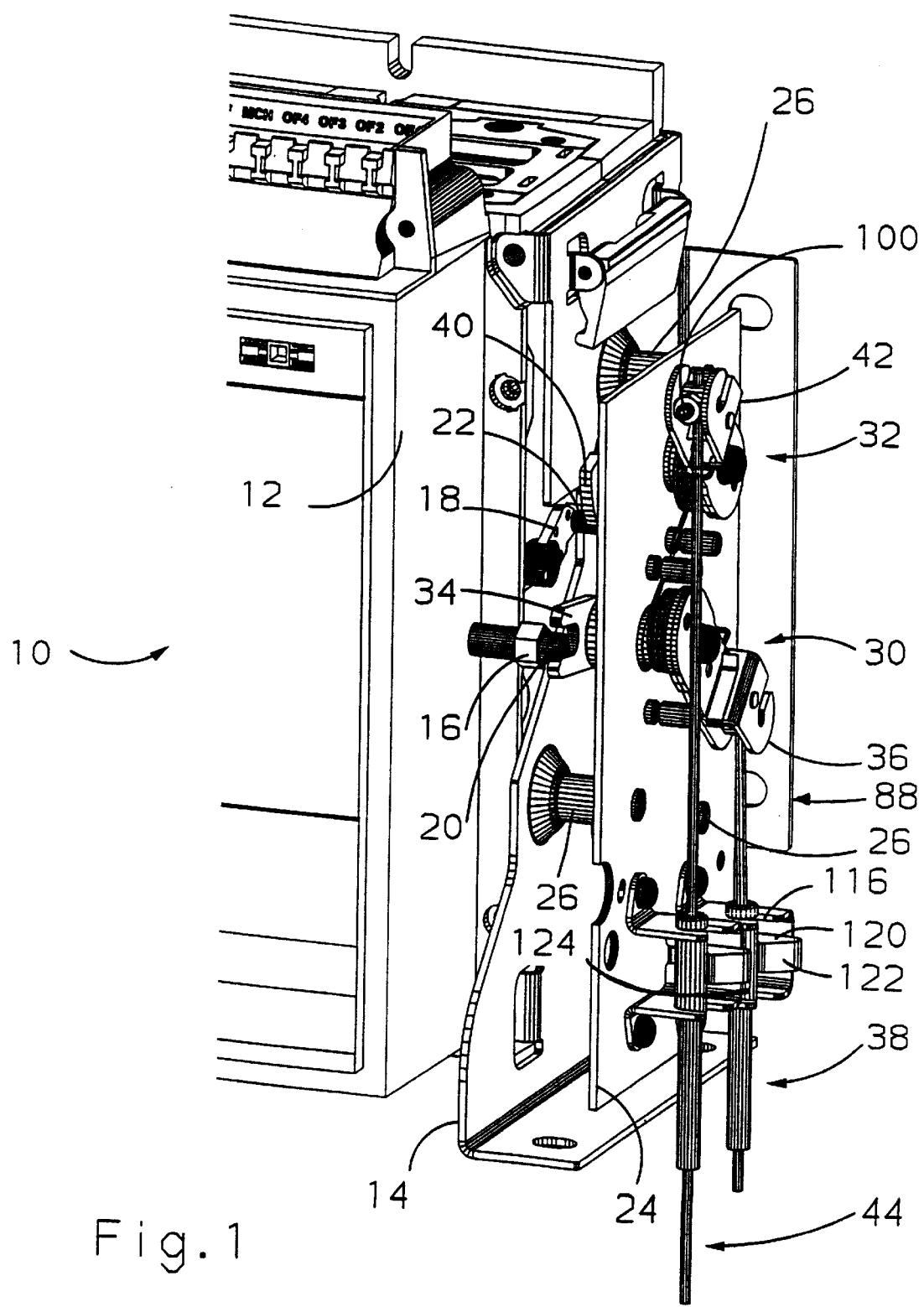
FIG. 1 represents a perspective view of an installation according to a first embodiment of the invention, comprising a switchgear apparatus equipped with a support plate of a kinematic transmission by cable.
Figure 2:
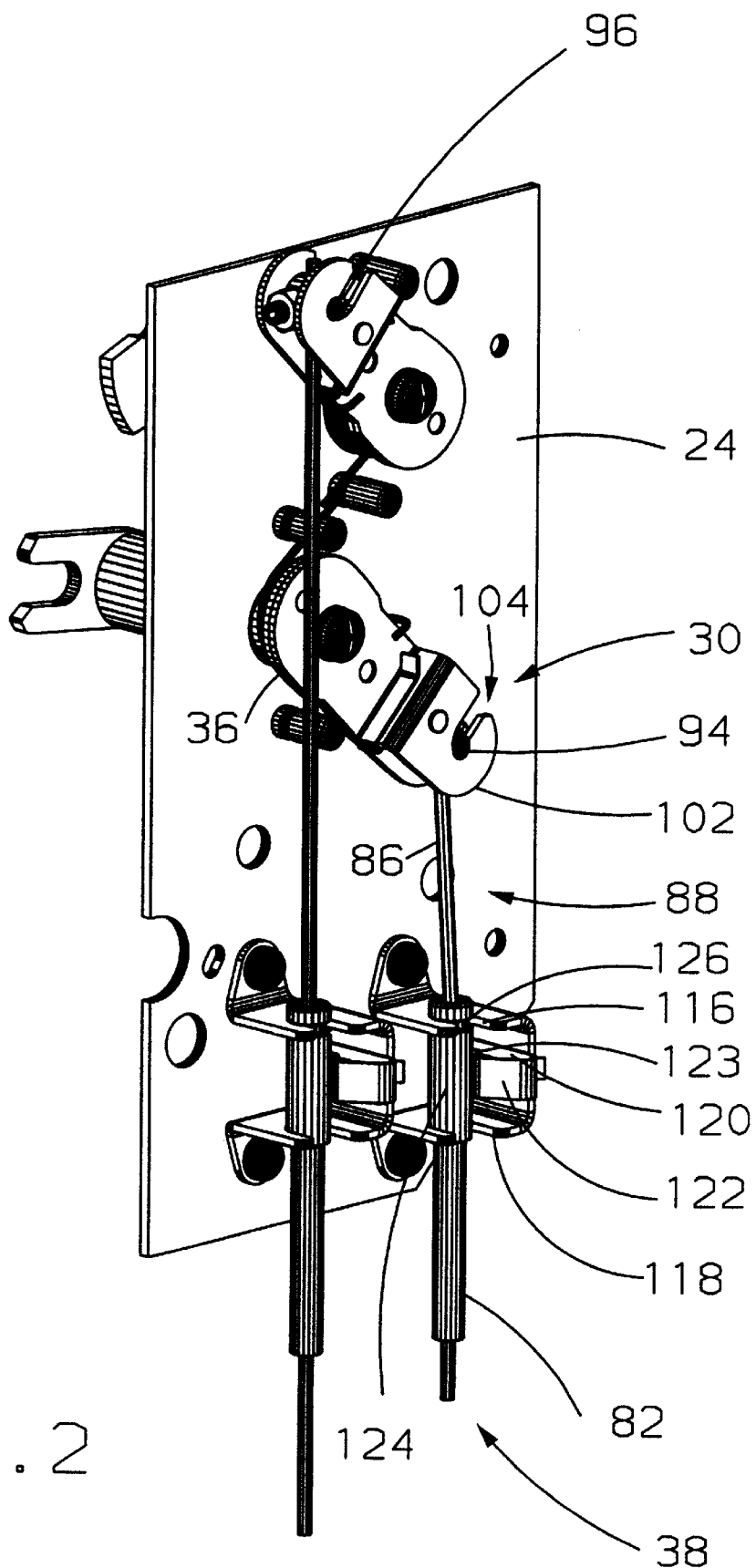
FIG. 2 represents a perspective view of the support plate of FIG. 1.

With reference to FIGS. 1 and 2, a circuit breaker 10 comprises a case 12 with a lateral flange 14 via which two levers 16, 18 are accessible from outside. The lever 16 is connected directly to a switching bar (not represented) of the apparatus. Its free end is provided with a pin 20 whose position reflects the position of the bar, and therefore the open or closed position of the circuit breaker poles. The lever 18 is a control lever controlling locking of a drive mechanism of the switching bar. Its free end is provided with a pin 22 which is able to take a locked position reflecting a state of the mechanism in which the latter can not act on the switching bar so as to reclose the circuit breaker, so that the poles of the circuit breaker are locked in the open position, and an unlocked position in which the lever does not interfere with the mechanism, so that it is possible to open or close the poles of the circuit breaker 10 by means of a control means, not represented. Furthermore, the lever 18, when moving from its unlocked position to its locked position, acts on a trip latch opening the circuit breaker poles. The lever 18 and its action on the switching bar drive mechanism are described in greater detail in French Patent Application filed under the reference number 98 05120, incorporated on this point here by reference.

A support plate 24 is fixed to the flange 14 by three feet 26 and supports two transmission levers 30, 32. The transmission lever 30 comprises a forked arm 34 acting on the pin 20 and an arm 36 connected to a kinematic transmission device by cable 38. In like manner, the transmission lever 32 comprises an arm 40 acting on the pin 22 and an arm 42 connected to a kinematic transmission device by cable 44.

Figure 3:
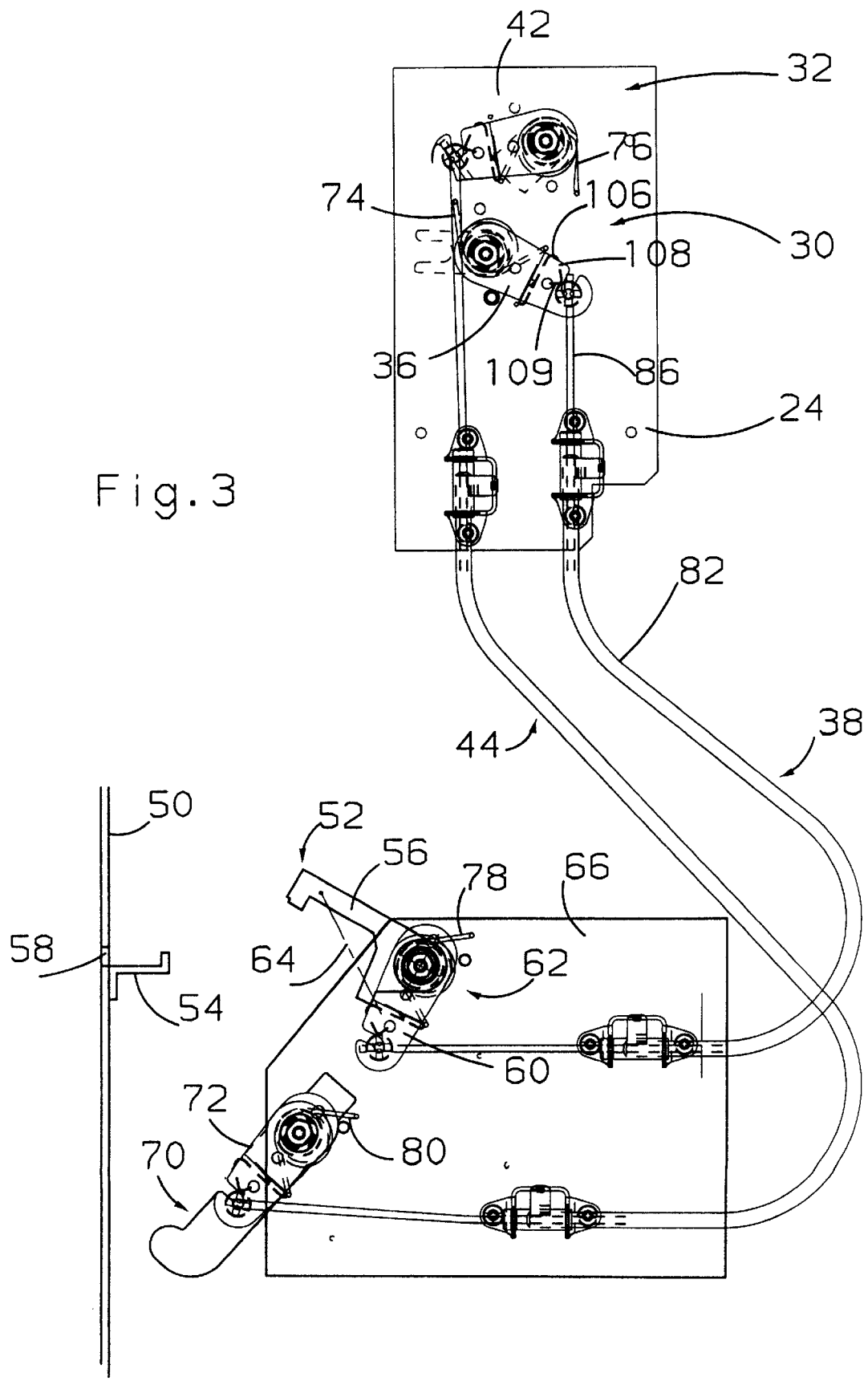
FIGS. 3 to 5 schematically represent the kinematic transmission by cable of FIG. 1, in various positions.
Figure 4:
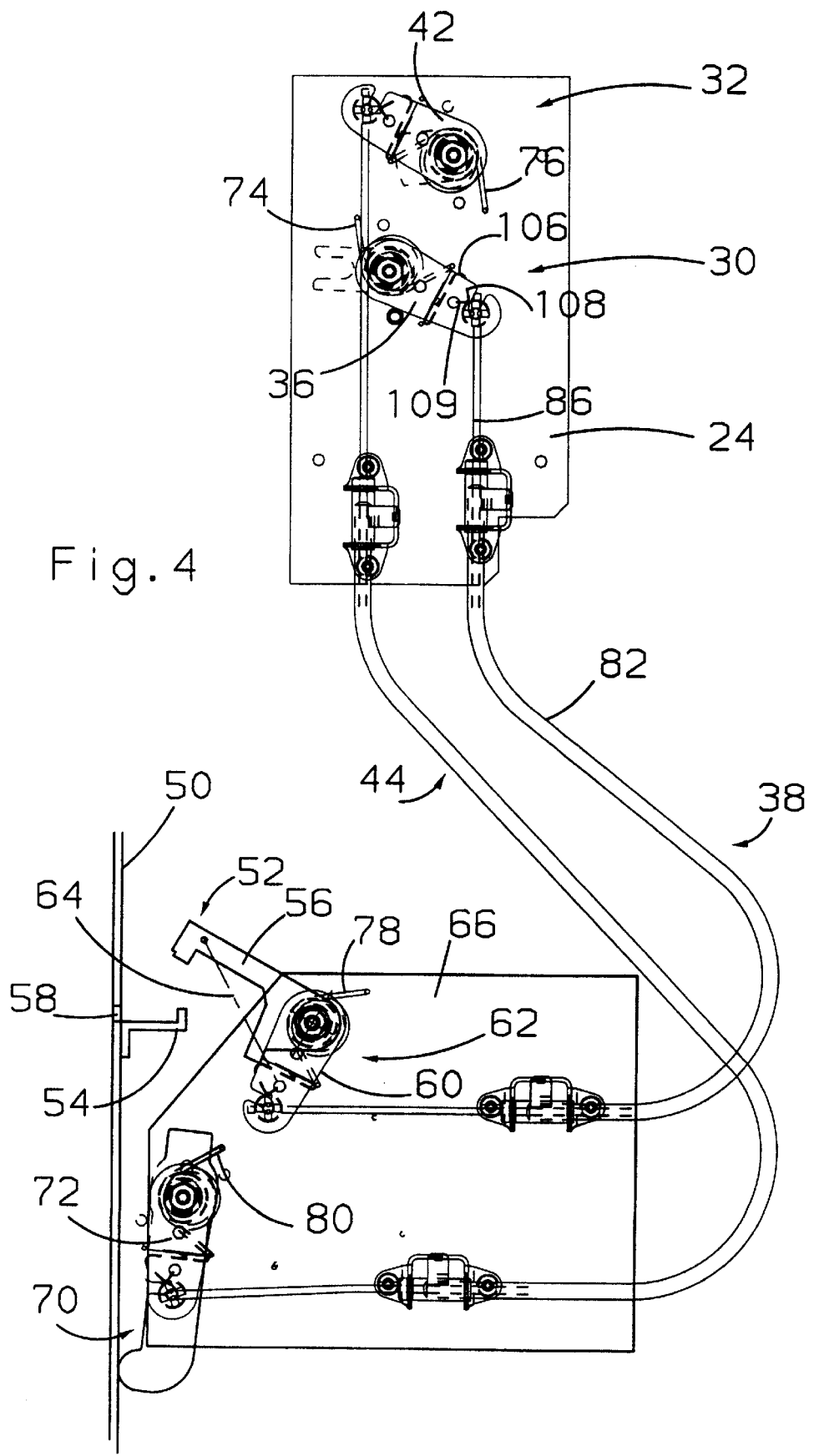
Figure 5:
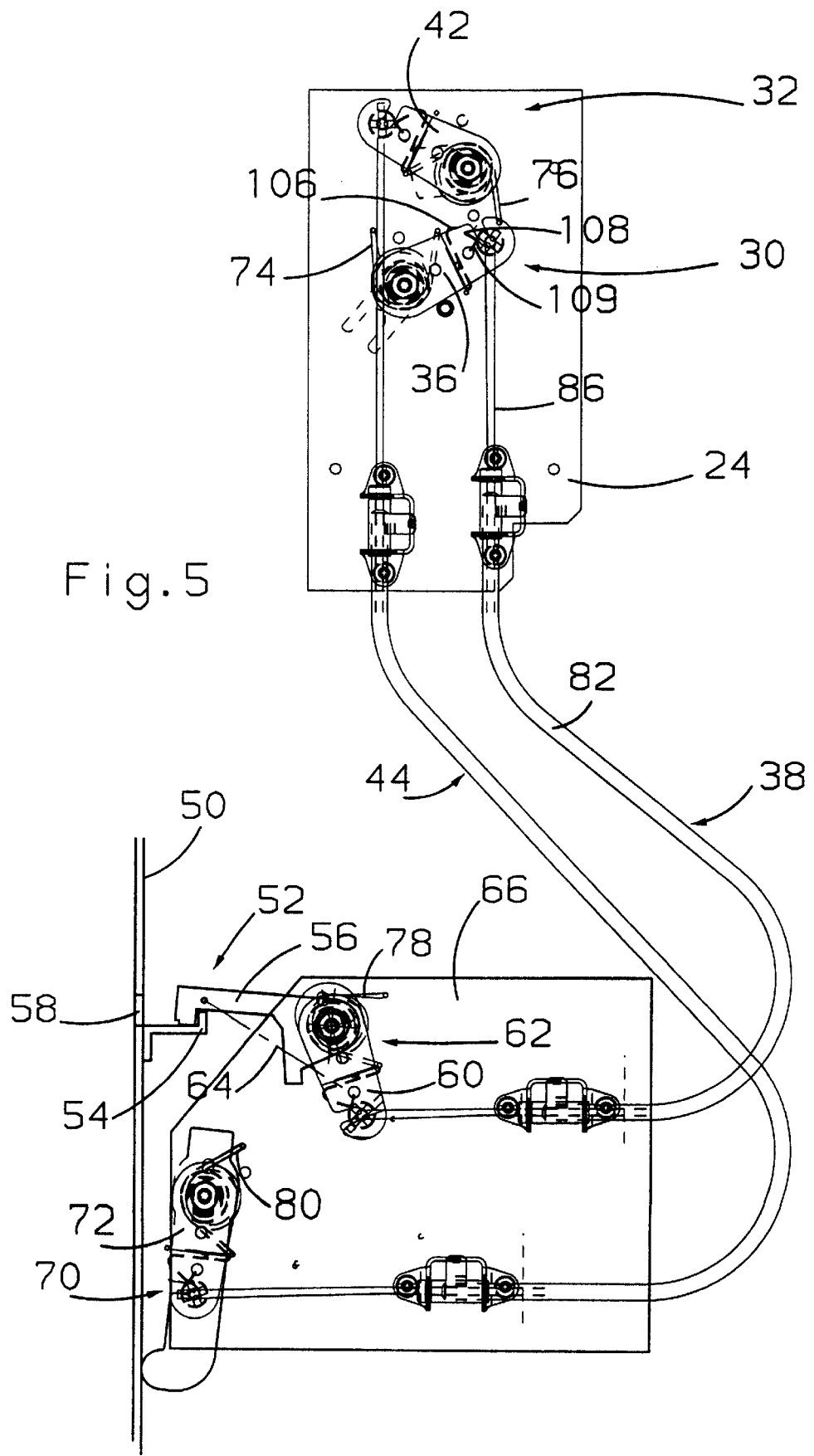

The circuit breaker 10 is housed in an electrical cabinet closed by an access door 50 schematically represented in FIGS. 3 to 5. A lock 52 comprising a catch 54 securely fixed to the panel of the door 50, in which a pivoting latch 56 is inserted, enables the access door 50 to be closed. The door panel comprises an orifice 58 for access to the catch 54. The latch 56 is connected to an arm 60 of a lever 62 by a traction spring 64. The lever 62 and latch 56 have a common geometric pivoting axis, fixed with respect to a base 66 securely affixed to the frame of the door 50. Furthermore, a plunger lever 70 comprises an arm 72 pivoting around a spindle arranged near the edge of the base 66, so that the free end of the arm 72 is located on the path of the panel of the door 50 when the latter is closed. The levers 30, 32, 62, 70 are biased by torsion return springs 74, 76, 78, 80.

Figure 6:
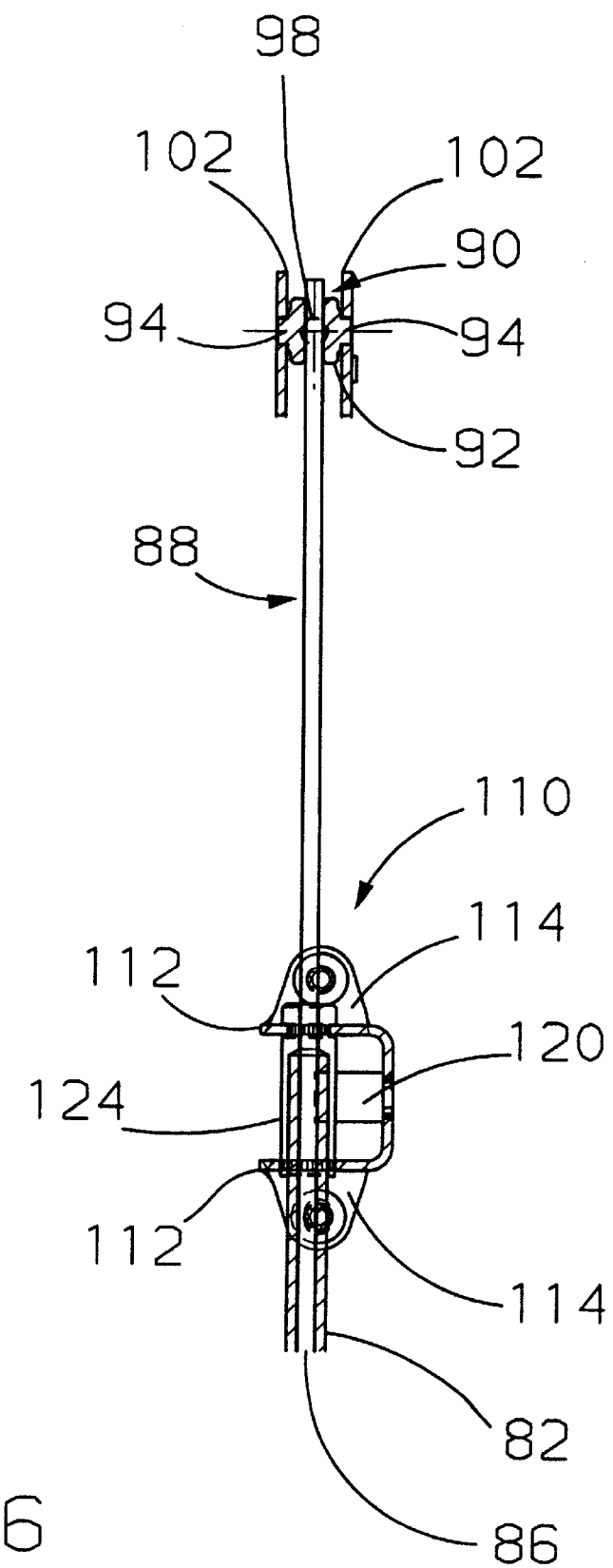
FIG. 6 represents the cable equipped with fixing means.

The two cables 38, 44, although having different functions and lengths, have identical structures and identical fixing means, so that the description of one of the two will be sufficient as it is immediately transposable to the other. The cable 38, visible in cross-section in FIG. 6, comprises a tubular sheath 82 made of flexible synthetic material acting as guiding for a core 86 sliding axially in the sheath. The core 86 is relatively flexible and works in traction only. On the side of each of its ends, the core 86 of the cable comprises a section 88 extending beyond the sheath 82 and provided with a latching end-piece 90. The end-piece 90 is formed by a median cylinder 92 extended at each axial end by a crank pin 94 of smaller diameter. The median cylinder 92 is provided with a diametral bore allowing passage of the free end of the core 86 of the cable, and with a radial tapped bore 98 perpendicular to the diametral bore and opening out into the latter, enabling insertion of a clamping screw 100 represented in FIG. 1, securing the core 86 with respect to the end-piece 90.

The free end of the lever 30 is formed by two parallel flanges 102 each comprising a notch 104 constituting a bearing housing one of the crank pins 94 of the corresponding end-piece. A flexion spring blade 106, visible in FIGS. 3 to 5, is fixed to the lever 30. It comprises a V-shaped end portion materializing two ramps 108, 109 and which, in the absence of the end-piece 90, occupies a part of the space reserved for the latter between the two flanges 102. The levers 32, 62 and 70 are of identical constitution to that of the lever 30.

The sheath 82 of the cable 38 is fixed via its ends to fixed parts of the installation. Two identical U-shaped support parts 110, each comprising two parallel flanges 112 and two fixing lugs 114 are provided for this fixing. Each of the flanges 112 comprises a notch 116, 118 whose bottom constitutes a housing, the notch 116 being narrower than the other. A spring blade 120 whose free end is curved in a V-shape and forms two ramps 122, 123 is arranged between the flanges 112. The sheath is provided at its ends with tubular cylindrical end-pieces 124 each provided with a positioning groove 126. These end-pieces comprise a recessing with the same external diameter as the sheath, extended by a bore of smaller diameter, materializing a stop surface of the axial end of the sheath 82 and an orifice for passage of the core 86. In the absence of the end-piece 124, the V-shaped end of the spring blade 120 occupies a part of the space reserved for the end-piece between the two flanges 112.

Fitting of the cable is performed in the following manner.

The fitter first cuts the cable 30 to the required length and prepares the core end-pieces 90 and sheath end-pieces 124 on a work bench. The sheath end-pieces 124 are first of all engaged on the two ends of the sheath 82, then each end of the core 86 is engaged in the diametral hole of an end-piece 90 and secured by tightening the screw 100.

Once this operation has been completed, the fitter inserts the sheath end-pieces 124 radially, i.e. perpendicularly to the axis of the end-piece 124, in the notches 116, 118 of the U-shaped support 110, the positioning groove 126 operating in conjunction with the narrower notch 116. The ramp 122 of the spring 120 comes into contact with the endpiece 124 and the spring 120 flexes. The rounded tip of the V-shaped end 122 constitutes a dead point beyond which the ramp 123 pushes the end-piece into the housing formed by the bottom of the notches 116,118.

In like manner, the crank pins 94 are inserted in the notches 104 pressing on the cylinder 92 which operates in conjunction with the ramp 108 of the V-shaped spring, so that this ramp is cleared and enables the end-piece 90 to be inserted to the bottom of the notches 104 which act as housing. In this position, the second V-shaped ramp 109 of the spring 104 operates in conjunction with the central cylinder of the end-piece and holds the end-piece in its housing.

Passing the dead points of the springs 106 and 120, which requires an insertion threshold force to be exceeded, gives the fitter a tactile indication of insertion. Extraction is performed in the reverse manner to insertion. However the ramps of the springs 106 and 120 are shaped and arranged in such a way that the minimum force necessary for extraction of the end-pieces is greater than the minimum force necessary for insertion thereof. According to an alternative embodiment, not represented, an extension of the free end of the springs can be provided beyond the V-shaped part, so as to form a tail accessible by means of a tool such as a screwdriver. The fitter simply has to press on the screw to force the spring to move away to enable the cable to be withdrawn.

Assembly is performed in the same manner for the two ends of the cable 38 and for that of the cable 44.

The fitted device operates in the following manner.

The torsion springs 74, 76, 78, 80 urge the levers 30, 32, 62, 70 each in a direction enabling the cores of the cables to be kept constantly taut. The spring 80 is stronger than the spring 76 so that the lever 70 is master and the lever 32 slave. As far as the cable 38 is concerned, the springs 74, 78 are of equivalent power. The transmission lever 30, controlled by the position of the bar, is master, and the lever 62 is slave.

In the position of FIG. 3, the transmission lever 30 reflects the open position of the switching bar. The door 50 is open so that the lever 70 is in the position of FIG. 3, due to the preponderance of the spring 80 over the spring 76. The drive mechanism of the circuit breaker switching bar is therefore in the locked position and the drive mechanism can only act on the bar. When the door 50 is reclosed in the position of FIG. 4 and kept in this position by a main locking latch not represented in the figure, the lever 70 is pushed back by the door panel 50 so that the lever 32, due to the force of its own torsion spring 76, takes the unlocking position of FIG. 4. It then becomes possible to actuate the drive mechanism and to reclose the apparatus. If a closing order of the apparatus is given, by external means which are not described, the switching bar pivots and drives the transmission lever 30 to the position of FIG. 5. The core 86 of the cable 38 transmits this movement to the lever 62 which takes the position of FIG. 5. The latch 56, urged by the traction spring 64, engages in the catch 54 and locks the door 50, so that the door 50 remains locked so long as the circuit breaker poles are closed. It remains possible to fraud the safety device by inserting a tool in the orifice 58 to move the latch 56 against the force of the traction spring 64, the lever 62 remaining immobile.

The transmission cable 38 thus performs interlocking between the circuit breaker lever 30 and the door mechanism lever 62, in which the lever 30 is master and the lever 62 is slave. The transmission cable 44 performs in parallel interlocking between the circuit breaker lever 32 and the door mechanism lever 70, in which the lever 70 is master and the lever 32 is slave. The combination of these two interlocks achieves interlocking between the circuit breaker 10 and the door 50.

Figure 7:
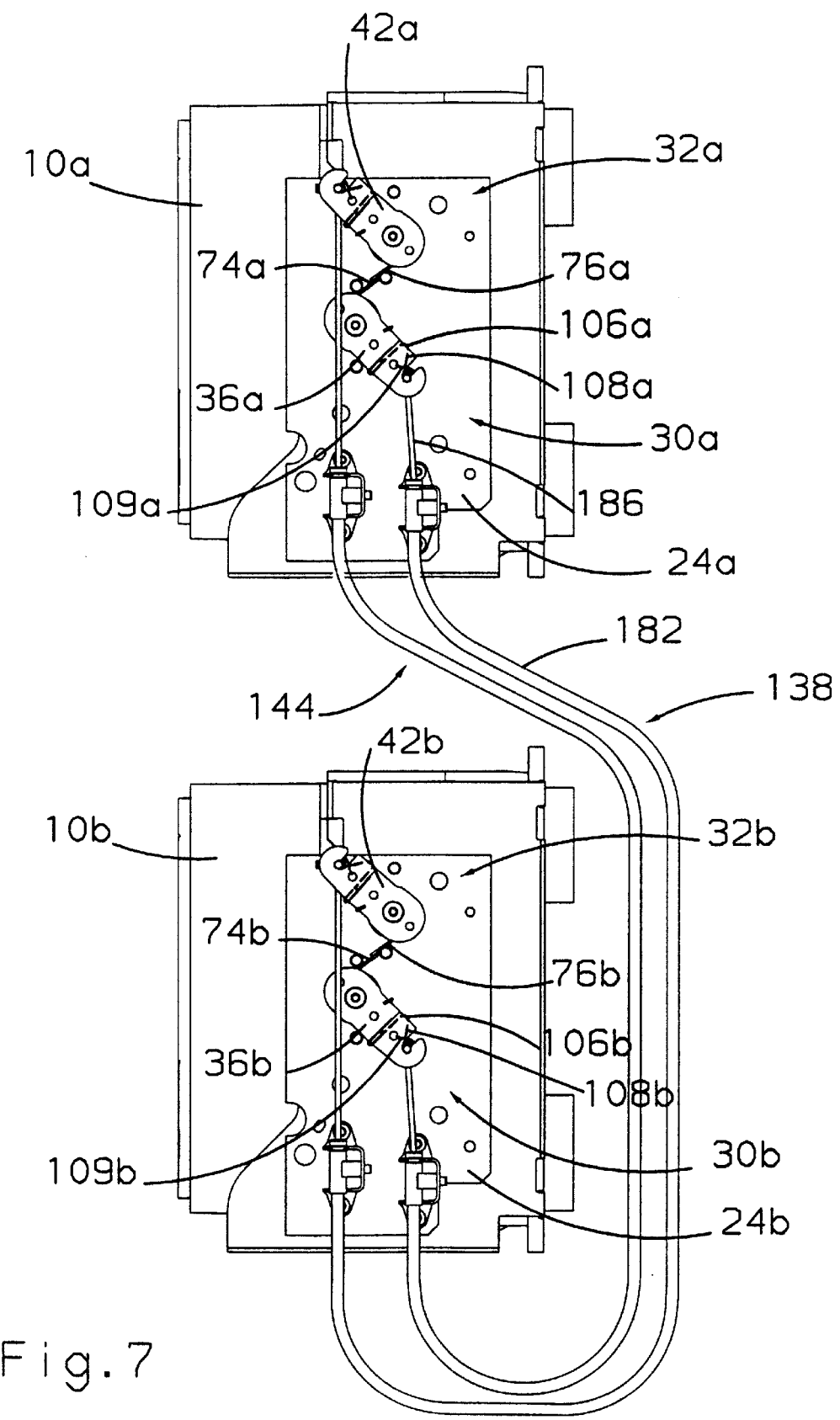
FIG. 7 represents an installation according to a second embodiment of the invention, comprising two switchgear apparatuses connected to one another by kinematic transmissions by cable.

A second embodiment of the invention is illustrated by FIG. 7, which schematically represents two identical support plates 24a and 24b, each supported by a circuit breaker 10a, 10b, and connected to one another by two interlocking cables 138, 144 according to the invention. By analogy with the first embodiment, the same reference numbers have been used for the parts corresponding to those of the first embodiment, with the letter "a" added for the first circuit breaker and the letter "b" added for the second circuit breaker. The cable 138, comprising the sheath 182 protecting the core 186, connects the transmission lever 32a to the transmission lever 32b, whereas the cable 144 connects the lever 30a to the lever 32b. The springs 76a, 76b and 74a, 74b are all identical. In the position represented in FIG. 7, the two circuit breakers 10a and 10b are open and it is possible to close either one or the other circuit breaker indifferently. If the switchgear apparatus 10a is closed, the lever 30a pivots in the counterclockwise direction and opens the apparatus 10b. So long as the circuit breaker 10a is closed, the circuit breaker 10b remains locked in the open position due to the position imposed on the lever 32b. In exactly the same way, when the circuit breaker 10b is closed from the position of FIG. 7, the circuit breaker 10a is locked in the open position, since the lever 30b moves the lever 32a to the locked position, i.e. to the position preventing the mechanism of the circuit breaker 10a from acting on the switching bar of this circuit breaker. The global interlocking achieved thus enables closing of one circuit breaker to be subordinated to opening of the other. The two circuit breakers cannot be in the closed position at the same time.

The invention is naturally not restricted to the embodiments described above. The spring blades 106 and 120 can be replaced by any other type of suitable flexible means. For example, a flexible means can be envisaged comprising a rigid securing latch, biased by a spring. A sheath end-piece can also be envisaged whose external cylindrical wall can be elastically deformed, operating in conjunction with a groove in the form of a bottle-neck whose bottom forms a housing with the same dimensions as the non-solicited end-piece, connected to the inlet opening by a neck narrower than the diameter of the end-piece.

The U-shaped structure of the sheath supports with two parallel flanges provided with grooves operating in conjunction with a cylinder constituting the end-piece can be reversed, by using a sheath end-piece provided with two lugs each comprising a groove, this end-piece engaging on a cylindrical support securedly affixed to the frame of the electrical apparatus. It is moreover possible to provide one flange only, presenting a groove whose edges operate in conjunction with an annular groove of the sheath end-piece, the latter being deeper than that of the above example, in order to limit pivoting of the sheath.

Fixing of the cables is applicable not only to interlocking between an electrical switchgear device and a door, or to interlocking between several switchgear devices, but also to interlocking between a switchgear device and a mechanical remote control.

Interlocking can be used not only for interlocking a circuit breaker but also for interlocking any other type of electrical switchgear apparatus having the same dimensional constraints.

What is claimed is:

1. An installation comprising at least one electrical switchgear apparatus and a kinematic transmission cable designed to interlock a movable means of the electrical switchgear apparatus with a mechanism external to the apparatus, the electrical switchgear apparatus comprising a frame, the kinematic transmission cable comprising a flexible sheath and a core able to slide in the sheath, the flexible sheath comprising an end section constituting a first part of the cable fixed with respect to the frame of the electrical switchgear apparatus by a first fixing means, the core comprising an end section external to the sheath constituting a second part of the cable fixed to the first movable means by a second fixing means, wherein at least one of the fixing means comprises an end-piece operating in conjunction with the corresponding part of the cable, a housing designed to receive the end-piece, and locking means with dead point passage designed to oppose insertion of the end-piece in the housing when the force exerted on the locking means in an insertion direction remains lower than an insertion threshold and to enable insertion of the end-piece in the housing when the force exerted on the locking means in an insertion direction is greater than the insertion threshold.

2. The installation according to claim 1, wherein said locking means are designed to oppose the end-piece from being extracted from the housing when the force exerted on the locking means in an extraction direction remains lower than an extraction threshold and to enable the end-piece to be extracted from the housing when the force exerted on the locking means in an extraction direction is greater than the extraction threshold.

3. The installation according to claim 1, wherein the housing is formed by two notches made in two parallel flanges of a support.

4. The installation according to claim 1, wherein the locking means comprise a locking part able to take an unlocking position enabling the end-piece to be inserted in the housing and a locking position preventing the end-piece from being extracted from the housing, and a flexible return means urging the locking part to its locking position, the end-piece operating in conjunction with the flexible return means in such a way that the locking part is flexibly removed to its unlocking position when the end-piece is forcibly inserted in the housing.

5. The installation according to claim 4, wherein the flexible return means operates in conjunction with the end-piece in such a way that the locking part is flexibly removed to its unlocking position when the end-piece is forcibly extracted from the housing.

6. The installation according to claim 4, wherein the flexible return means is a spring acting directly on the end-piece.

7. The installation according to claim 6, wherein the spring is provided with a first ramp and a second ramp shaped in such a way that the first ramp is able to operate in conjunction with the end-piece to clear the flexible return means when the end-piece is inserted, the second ramp being designed to operate in conjunction with the end-piece to hold the latter in position in its housing.

8. The installation according to claim 7, wherein the second ramp is such that it is able to operate in conjunction with the end-piece to clear the flexible return means when extraction is performed.

9. The installation according to claim 8, wherein the first and second ramp are shaped in such a way that the extraction force threshold is lower than the insertion force threshold.

10. The installation according to claim 1, wherein the first and second means each comprise an end-piece operating in conjunction with the corresponding part of the cable, a housing designed to receive the end-piece, and locking means with dead point passage designed to oppose insertion of the end-piece in the housing when the force exerted on the locking means in an insertion direction remains lower than an insertion threshold and to enable insertion of the end-piece in the housing when the force exerted on the locking means in an insertion direction is greater than the insertion threshold.

* * * * *